United States Patent
Sawada et al.

(10) Patent No.: US 12,473,018 B2
(45) Date of Patent: Nov. 18, 2025

(54) ELECTRIC POWER STEERING DEVICE

(71) Applicant: NSK STEERING & CONTROL, INC., Tokyo (JP)

(72) Inventors: Hideki Sawada, Tokyo (JP); Hidetaka Koinuma, Tokyo (JP); Takayoshi Sugawara, Tokyo (JP)

(73) Assignee: NSK STEERING & CONTROL, INC., Tokyo (JP)

( * ) Notice: Subject to any disclaimer, the term of this patent is extended or adjusted under 35 U.S.C. 154(b) by 0 days.

(21) Appl. No.: 19/111,115

(22) PCT Filed: May 10, 2024

(86) PCT No.: PCT/JP2024/017490
§ 371 (c)(1),
(2) Date: Mar. 12, 2025

(87) PCT Pub. No.: WO2024/241922
PCT Pub. Date: Nov. 28, 2024

(65) Prior Publication Data
US 2025/0263113 A1    Aug. 21, 2025

(30) Foreign Application Priority Data
May 19, 2023   (JP) .................................. 2023-082835

(51) Int. Cl.
*B62D 5/04*   (2006.01)
(52) U.S. Cl.
CPC ......... *B62D 5/0463* (2013.01); *B62D 5/0409* (2013.01)
(58) Field of Classification Search
CPC ............................ B62D 5/0463; B62D 5/0409
See application file for complete search history.

(56) References Cited

U.S. PATENT DOCUMENTS

2021/0245805 A1    8/2021   Ishida et al.

FOREIGN PATENT DOCUMENTS

| JP | 2010-047203 A | 3/2010 |
|---|---|---|
| JP | 2011-063265 A | 3/2011 |

(Continued)

OTHER PUBLICATIONS

International Search Report for PCT/JP2024/017490 dated Jul. 30, 2024 (PCT/ISA/210).

(Continued)

*Primary Examiner* — Jacob D Knutson
(74) *Attorney, Agent, or Firm* — Sughrue Mion, PLLC

(57) ABSTRACT

An electric power steering device including: a motor configured to generate a steering assist force; a current command value calculation unit configured to calculate a current command value to control driving current of the motor; a current control unit configured to output a first voltage command value, based on current deviation of a measured value of the driving current to the current command value; a first gain setting unit configured to set a first gain depending on rotational velocity of the motor; a disturbance voltage suppression unit configured to calculate a third voltage command value by adding output from a first delay element to a second voltage command value obtained by limiting the first voltage command value by the first gain and input the third voltage command value to the first delay element; and a driving circuit configured to drive the motor, based on the third voltage command value.

10 Claims, 7 Drawing Sheets

(56) References Cited

FOREIGN PATENT DOCUMENTS

| | | | | |
|---|---|---|---|---|
| JP | 2017017899 A | * | 1/2017 | ............ H02P 21/05 |
| JP | 2023-167187 A | | 11/2023 | |
| WO | WO-2019171438 A1 | * | 9/2019 | ............ H02P 21/06 |
| WO | 2020/158350 A1 | | 8/2020 | |

OTHER PUBLICATIONS

Written Opinion for PCT/JP2024/017490 dated Jul. 30, 2024 (PCT/ISA/237).

* cited by examiner

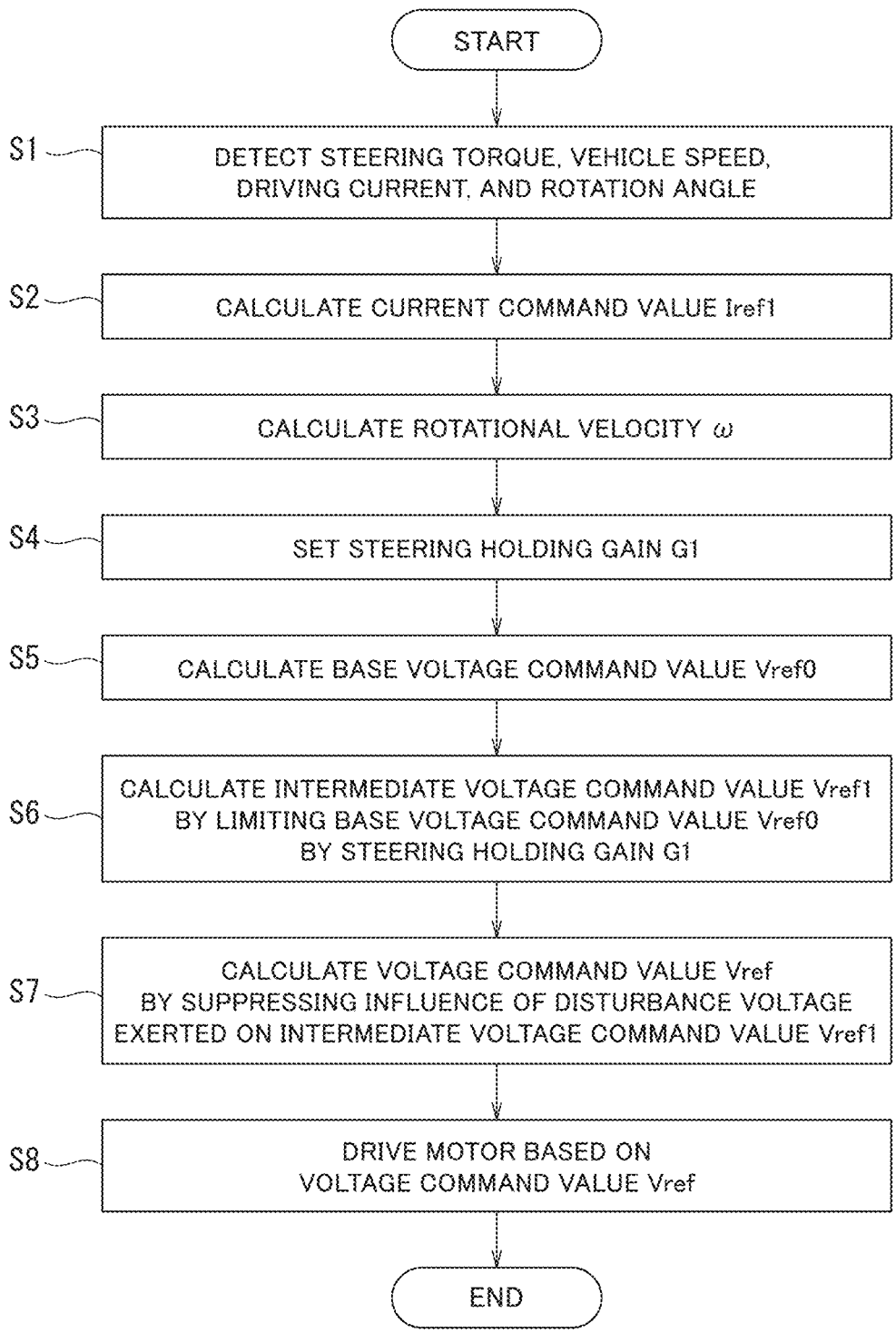

ELECTRIC POWER STEERING DEVICE

CROSS REFERENCE TO RELATED APPLICATIONS

This application is a National Stage of International Application No. PCT/JP2024/017490 filed May 10, 2024, claiming priority based on Japanese Patent Application No. 2023-082835 filed May 19, 2023.

TECHNICAL FIELD

The present invention relates to an electric power steering device.

BACKGROUND ART

An electric power steering device described in PTL 1 described below includes a steering assist motor configured to generate a steering assist force, sets a current command value, based on steering torque exerted on a steering shaft of a vehicle, and controls the steering assist motor, based on current deviation between a detected value of driving current of the steering assist motor and a current command value.

CITATION LIST

Patent Literature

PTL 1: JP 2010-47203 A

SUMMARY OF INVENTION

Technical Problem

In an electric power steering device that provides a steering assist force to a steering system of a vehicle, sound or vibration sometimes occurs due to noise included in a control signal. Since when the steering system is in a steering holding state in which a steering angle is barely changed, occurrence of sound or vibration is likely to stand out, it is preferable to suppress influence of noise. For example, arranging a noise reduction filter in a preceding stage or a succeeding stage of a feedback control device controlling driving current of a steering assist motor enables such influence of noise to be suppressed.

On the other hand, a high responsiveness of control is required for the electric power steering device at the time of regular steering. When a noise reduction filter as described above is installed, switching of filter characteristics is required to be performed between at the time of regular steering and in the steering holding state. As a result, control becomes complex and time and effort required for adaptation of filter characteristics increase.

The present invention has been made in consideration of the above-described circumstances, and an object of the present invention is to easily achieve at the same time both responsiveness of control of an electric power steering device at the time of regular steering and suppression of influence of noise while a steering system is in the steering holding state.

Solution to Problem

In order to achieve the above-described object, according to an aspect of the present invention, there is provided an electric power steering device including: a motor configured to generate a steering assist force to be provided to a steering system of a vehicle; a current command value calculation unit configured to calculate a current command value to control driving current of the motor; a current control unit configured to output a first voltage command value, based on current deviation of a measured value of driving current of the motor with respect to the current command value; a first gain setting unit configured to set a first gain depending on rotational velocity of the motor; a disturbance voltage suppression unit configured to calculate a third voltage command value by adding output from a first delay element to a second voltage command value obtained by limiting the first voltage command value by the first gain and also input the third voltage command value to the first delay element; and a driving circuit configured to drive the motor, based on the third voltage command value.

Advantageous Effects of Invention

According to the present invention, it is possible to easily achieve at the same time both responsiveness of control of an electric power steering device at the time of regular steering and suppression of influence of noise while a steering system is in the steering holding state.

BRIEF DESCRIPTION OF DRAWINGS

FIG. 8 is a flowchart of an example of a control method of the electric power steering device of the embodiment.

DESCRIPTION OF EMBODIMENTS

Embodiments of the present invention will be described in detail with reference to the drawings. Note that the embodiments of the present invention to be described below indicate devices and methods to embody the technical idea of the present invention by way of example, and the technical idea of the present invention does not limit the constitution, arrangements, and the like of the constituent components to those described below. The technical idea of the present invention can be subjected to a variety of alterations within the technical scope prescribed by the claims described in CLAIMS.

Configuration

Figure 1:
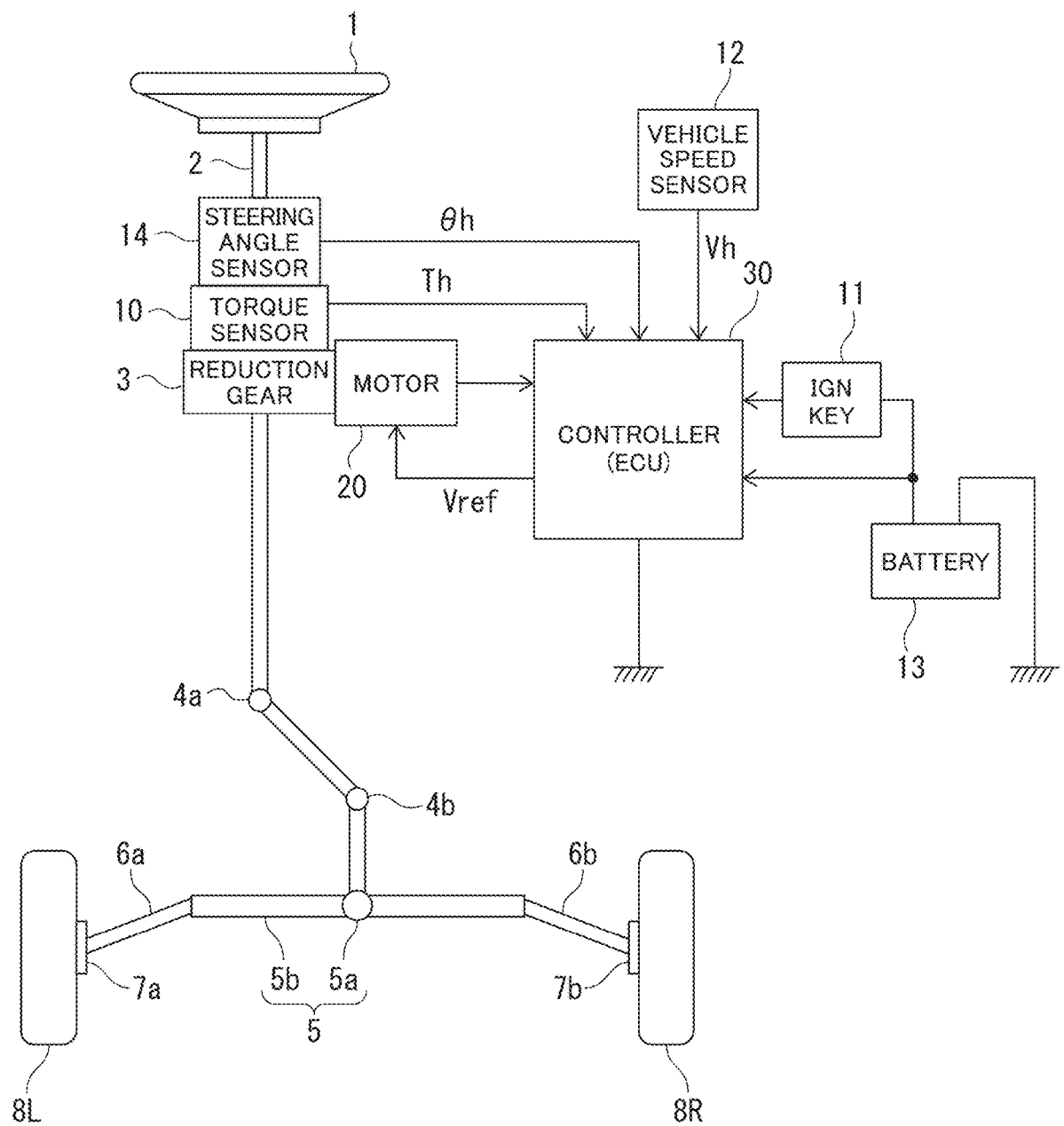
FIG. 1 is a configuration diagram illustrative of an outline of an example of an electric power steering device of an embodiment.

FIG. 1 is a configuration diagram illustrative of an outline of an example of an electric power steering device of an embodiment. A steering shaft (steering wheel shaft) 2 of a steering wheel 1 is connected to steered wheels 8L and 8R by way of a reduction gear (worm gear) 3 that constitutes a speed reduction mechanism, universal joints 4a and 4b, a pinion rack mechanism 5, and tie rods 6a and 6b and further via hub units 7a and 7b.

The pinion rack mechanism 5 includes a pinion 5a that is coupled to a pinion shaft to which steering force is transmitted from the universal joint 4b and a rack 5b that meshes with the pinion 5a, and converts rotational motion transmitted to the pinion 5a to linear motion in the vehicle width direction by means of the rack 5b.

To the steering shaft 2, a torque sensor 10 configured to detect steering torque Th is disposed. To the steering shaft 2, a steering angle sensor 14 configured to detect a steering angle θh of the steering wheel 1 is also disposed.

A motor 20 configured to assist steering force of the steering wheel 1 is also connected to the steering shaft 2 via the reduction gear 3. To a controller 30 configured to control the electric power steering (EPS) device, power is supplied from a battery 13 and an ignition key signal is also input by way of an ignition (IGN) key 11.

Note that means for providing a steering assist force is not limited to a motor, and various types of actuators can be used.

The controller 30 is an electronic control unit (ECU) configured to perform calculation of a current command value of an assist control command, based on steering torque Th detected by the torque sensor 10, vehicle speed Vh detected by a vehicle speed sensor 12, and a steering angle θh detected by the steering angle sensor 14 and control current to be supplied to the motor 20 in accordance with a voltage command value Vref obtained by performing compensation and the like on the calculated current command value.

Note that the steering angle sensor 14 is not an essential component and the steering angle θh may be calculated by adding a torsion angle of a torsion bar in the torque sensor 10 to a rotation angle acquired from a rotation angle sensor configured to detect a rotation angle of the rotation shaft of the motor 20.

In addition, a turning angle of the steered wheels 8L and 8R may be used in place of the steering angle θh. The turning angle may be detected by, for example, detecting a displacement amount of the rack 5b.

The controller 30 includes, for example, a computer including a processor and peripheral components, such as a storage device. The processor may be, for example, a central processing unit (CPU) or a micro-processing unit (MPU).

The storage device may include one of a semiconductor storage device, a magnetic storage device, and an optical storage device. The storage device may include registers, a cache memory, or a memory, such as a read only memory (ROM) and a random access memory (RAM), that is used as a main storage device.

Functions of the controller 30, which will be described below, are achieved by, for example, the processor of the controller 30 executing computer programs stored in the storage device.

Note that the controller 30 may be formed by use of dedicated hardware for executing each type of information processing that will be described below.

For example, the controller 30 may include functional logic circuits that are set in a general-purpose semiconductor integrated circuit. For example, the controller 30 may have a programmable logic device (PLD), such as a field-programmable gate array (FPGA), or the like.

Next, with reference to FIG. 2, an example of a functional configuration of a steering assist function performed by the controller 30 will be described. The controller 30 includes a current command value calculation unit 40, filters 41 and 44, an angular velocity conversion unit 42, a steering holding gain setting unit 43, a current control unit 45, a voltage command value limiting unit 46, a disturbance voltage suppression unit 47, a pulse width modulation (PWM) control unit 48, and an inverter (INV) 49.

The current command value calculation unit 40 calculates, based on at least the steering torque Th and the vehicle speed Vh, a base current command value Iref that is a current command value to control driving current of the motor 20.

The filter 41 outputs a current command value Iref1 obtained by reducing noise included in the base current command value Iref by performing filter processing on the base current command value Iref. The filter 41 may be, for example, a low-pass filter.

The angular velocity conversion unit 42 acquires a rotation angle θm from a rotation angle sensor 21 configured to detect a rotation angle of a rotation shaft of the motor 20. The angular velocity conversion unit 42 calculates rotational velocity ω of the motor 20, based on temporal change in the rotation angle θm.

The steering holding gain setting unit 43 sets a steering holding gain G1, based on the rotational velocity ω of the motor 20 and outputs the steering holding gain G1 to the current control unit 45 and the voltage command value limiting unit 46. The steering holding gain G1 is an example of a "first gain" described in the claims.

Figure 3:
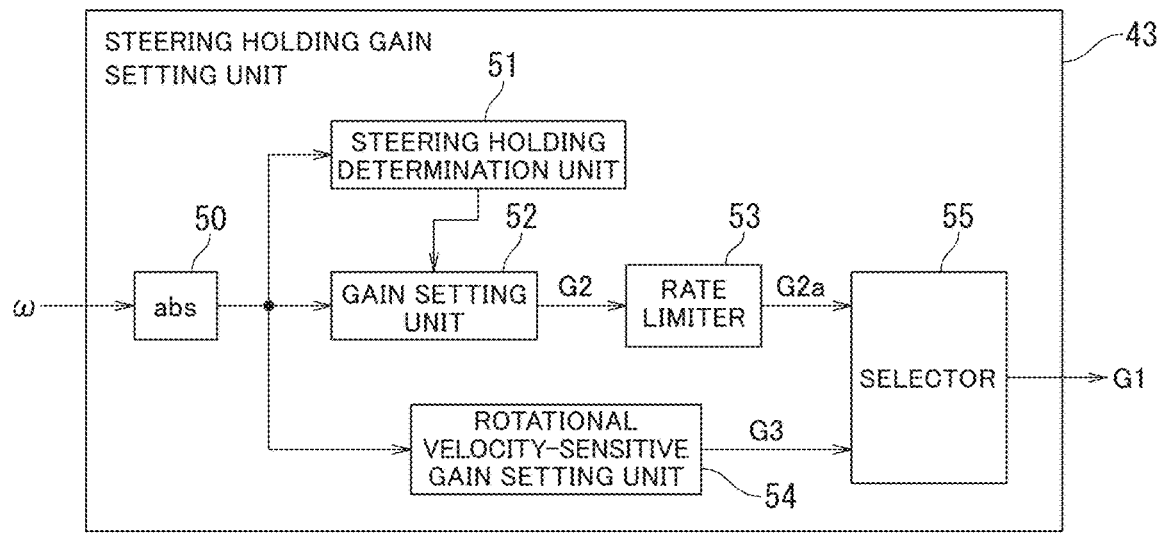
FIG. 3 is a block diagram illustrative of an example of a functional configuration of a steering holding gain setting unit.

FIG. 3 is a block diagram illustrative of an example of a functional configuration of the steering holding gain setting unit 43. The steering holding gain setting unit 43 includes an absolute value calculation unit (abs) 50, a steering holding determination unit 51, a gain setting unit 52, a rate limiter 53, a rotational velocity-sensitive gain setting unit 54, and a selector 55.

The absolute value calculation unit 50 calculates an absolute value |ω| of the rotational velocity of the motor 20.

The steering holding determination unit 51 determines whether or not a steering system of the vehicle is in a steering holding state, based on the absolute value |ω| of the rotational velocity of the motor 20.

The steering holding state is a state in which the steering angle θh of the steering wheel 1 or the steering shaft 2 is barely changed. For example, the steering holding determination unit 51 may determine that the steering system is in the steering holding state when the absolute value |ω| of the rotational velocity of the motor 20 is less than a determination threshold value ωth, and may determine that the steering system is not in the steering holding state when the absolute value |ω| is greater than or equal to the determination threshold value ωth. The steering holding gain setting unit 43 may calculate the rotational velocity ω, using the steering angle θh in place of the rotation angle θm of the motor 20.

The gain setting unit 52 sets a steering holding determination-dependent gain G2 depending on a determination result of the steering holding determination unit 51. The steering holding determination-dependent gain G2 is an example of a "second gain" described in the claims.

For example, the gain setting unit 52 may set a smaller steering holding determination-dependent gain G2 when the steering system is determined to be in the steering holding state than when the steering system is determined not to be in the steering holding state. That is, the gain setting unit 52 may set the steering holding determination-dependent gain G2 to a first value G21 when the steering system is determined to be in the steering holding state and may set the steering holding determination-dependent gain G2 to a second value G22 that is larger than the first value G21 when the steering system is determined not to be in the steering holding state. For example, the gain setting unit 52 sets the steering holding determination-dependent gain G2 to a value "0" when the steering system is determined to be in the steering holding state and sets the steering holding determination-dependent gain G2 to a value "1" when the steering system is determined not to be in the steering holding state.

In addition, when a state of the steering system changes from a state in which the steering system is determined not to be in the steering holding state to a state in which the steering system is determined to be in the steering holding state, the gain setting unit 52 may delay change in the steering holding determination-dependent gain G2 with respect to the change in the state of the steering system. In addition, when the state of the steering system changes from the state in which the steering system is determined to be in the steering holding state to the state in which the steering system is determined not to be in the steering holding state, the gain setting unit 52 may change the steering holding determination-dependent gain G2 immediately after the state of the steering system changes.

For example, at a time point when a predetermined delay time T0 has elapsed since a time point when the state of the steering system changed from the state in which the steering system is determined not to be in the steering holding state to the state in which the steering system is determined to be in the steering holding state, the gain setting unit 52 may change the steering holding determination-dependent gain G2 from the second value G22 to the first value G21. In addition, the gain setting unit 52 may change the steering holding determination-dependent gain G2 from the first value G21 to the second value G22 immediately after the state of the steering system changes from the state in which the steering system is determined to be in the steering holding state to the state in which the steering system is determined not to be in the steering holding state.

The rate limiter 53 limits a change rate of the steering holding determination-dependent gain G2. For example, the rate limiter 53 limits the change rate in such a way that an absolute value of the change rate of the steering holding determination-dependent gain G2 is less than or equal to a predetermined upper limit. The rate limiter 53 inputs a steering holding determination-dependent gain G2a the change rate of which is limited to the selector 55.

Figure 4A:
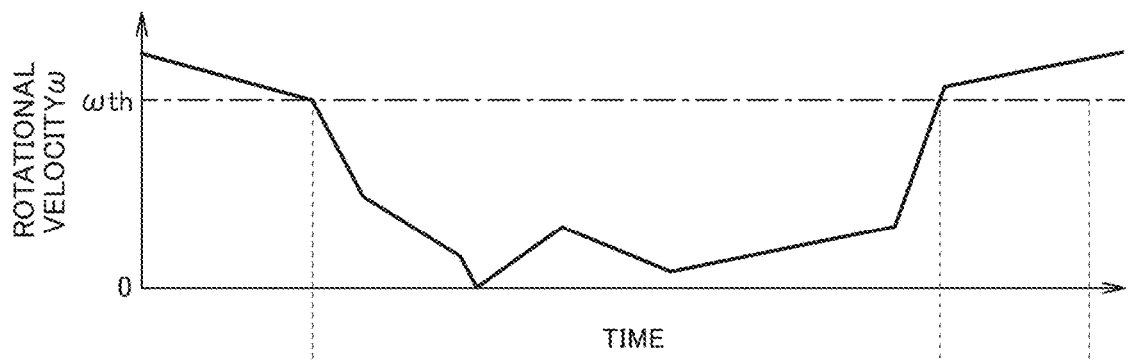
FIGS. 4A and 4B are explanatory diagrams of operation examples of the steering holding gain setting unit.
Figure 4B:
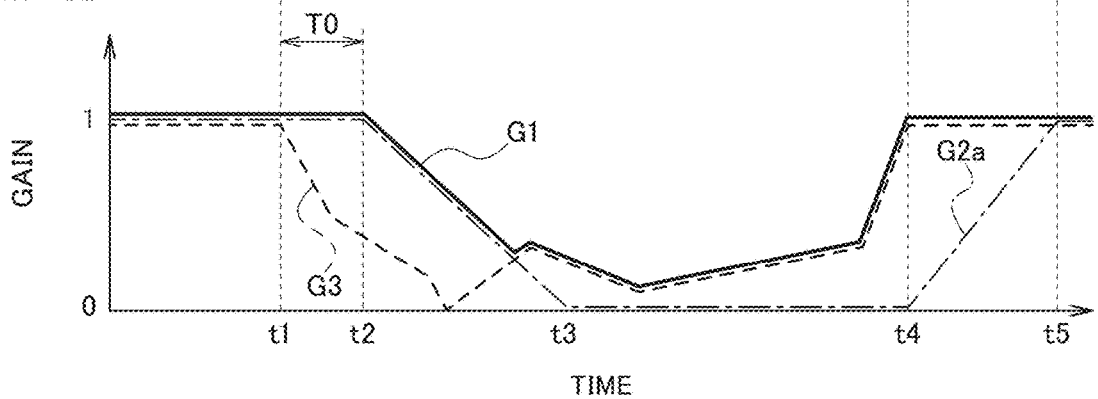

With reference to FIGS. 4A and 4B, an example of the steering holding determination-dependent gain G2a will be described. FIG. 4A is a timing diagram of temporal change in the rotational velocity ω of the motor 20. A dashed-dotted line in FIG. 4B is a timing diagram of temporal change in the steering holding determination-dependent gain G2a.

Since in a period before time t1, the rotational velocity ω of the motor 20 is greater than or equal to the determination threshold value ωth, the steering holding determination unit 51 determines that the steering system is not in the steering holding state. Thus, the gain setting unit 52 sets the steering holding determination-dependent gain G2 to the value "1". As a result, the steering holding determination-dependent gain G2a is also set to the value "1".

When the rotational velocity ω changes to less than the determination threshold value ωth at time t1, the steering holding determination unit 51 determines that the steering system is in the steering holding state. The gain setting unit 52 maintains the steering holding determination-dependent gain G2 at the value "1" until time t2 at which the predetermined delay time T0 has elapsed since time t1 is reached, and changes the steering holding determination-dependent gain G2 to the value "0" at time t2. The steering holding determination-dependent gain G2a the change rate of which is limited starts to decrease from time t2, decreases at a limited change rate, and reaches the value "0" at time t3.

When the rotational velocity ω changes to greater than or equal to the determination threshold value ωth at time t4, the steering holding determination unit 51 determines that the steering system is not in the steering holding state. The gain setting unit 52 immediately sets the steering holding determination-dependent gain G2 to the value "1". The steering holding determination-dependent gain G2a the change rate of which is limited starts to increase from time t4, increases at a limited change rate, and reaches the value "1" at time t5.

Since the gain setting unit 52 changes the steering holding determination-dependent gain G2 from the value "1" to the value "0" after the delay time T0 has elapsed in this way, the steering holding determination-dependent gain G2a changes in a delayed manner with respect to change in the rotational velocity of the motor 20. In addition, since the rate limiter 53 limits the change rate of the steering holding determination-dependent gain G2a, the steering holding determination-dependent gain G2a changes in a delayed manner with respect to change in the rotational velocity of the motor 20. Therefore, the steering holding determination-dependent gain G2a is an example of a "first component changing in a delayed manner with respect to change in rotational velocity of the motor" described in the claims.

FIG. 3 is now referred to. The rotational velocity-sensitive gain setting unit 54 sets a rotational velocity-sensitive gain G3 that changes in accordance with the absolute value |ω| of the rotational velocity of the motor 20. The rotational velocity-sensitive gain G3 is an example of a "third gain" described in the claims.

Figure 5:
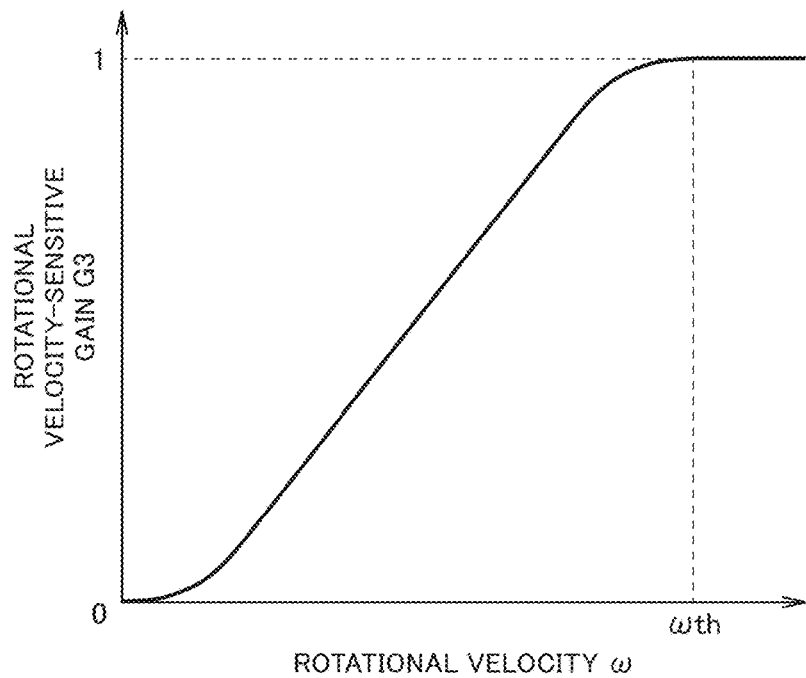
FIG. 5 is a schematic diagram of an example of characteristics of a rotational velocity-sensitive gain.

FIG. 5 is a schematic diagram of an example of characteristics of the rotational velocity-sensitive gain G3. The rotational velocity-sensitive gain G3 has characteristics of being smaller when the absolute value |ω| is small than when the absolute value |ω| is large. For example, the rotational velocity-sensitive gain G3 may have characteristics that the smaller the absolute value |ω| is, the smaller the rotational velocity-sensitive gain G3 becomes. For example, the rotational velocity-sensitive gain G3 may have characteristics of being maintained at a constant value within a range where the absolute value |ω| is greater than or equal to the determination threshold value @th.

In the example of the rotational velocity-sensitive gain G3 in FIG. 5, the rotational velocity-sensitive gain G3 is set to the value "0" when the absolute value |ω| of the rotational velocity is the value "0", and the rotational velocity-sensitive gain G3 is set to a value larger than "0" when the absolute value |ω| becomes larger than the value "0". In a range where the absolute value |ω| is greater than or equal to "0" and less than the determination threshold value ωth, the larger the absolute value |ω| becomes, the larger the rotational velocity-sensitive gain G3 also becomes.

The rotational velocity-sensitive gain G3 may nonlinearly change with respect to change in the absolute value |ω| or may be proportional to the absolute value |ω| (that is, may linearly change).

In a range where the absolute value |ω| is greater than or equal to the determination threshold value ωth, the rotational velocity-sensitive gain G3 is maintained at a constant value "1".

The rotational velocity-sensitive gain G3 is an example of a "second component changing in accordance with change in rotational velocity of the motor" described in the claims.

No delay time is provided to the rotational velocity-sensitive gain G3 like the delay time T0 for the steering holding determination-dependent gain G2a, and a change rate of the rotational velocity-sensitive gain G3 is not limited by a rate limiter. Thus, change in the rotational velocity-sensitive gain G3 with respect to change in the rotational velocity of the motor 20 has an extremely small delay (ideally, no delay). Therefore, the rotational velocity-sensitive gain G3 changes in accordance with change in the rotational velocity ω of the motor 20 with a smaller delay than delay of the steering holding determination-dependent gain G2a.

FIG. 3 is now referred to. The selector 55 selects a larger one of the steering holding determination-dependent gain G2a and the rotational velocity-sensitive gain G3 and outputs the selected one as the steering holding gain G1.

A dashed line in FIG. 4B indicates the rotational velocity-sensitive gain G3, and a solid line indicates the steering holding gain G1. Since immediately after the rotational velocity w of the motor 20 changes from a state of being greater than or equal to the determination threshold value ωth to a state of being less than the determination threshold value ωth, the steering holding determination-dependent gain G2a is larger than the rotational velocity-sensitive gain G3 until a certain time length elapses, the steering holding determination-dependent gain G2a is output as the steering holding gain G1.

Therefore, the steering holding gain G1 changes in a delayed manner with respect to change in the rotational velocity of the motor 20 until a certain time length elapses after a time point at which the rotational velocity ω of the motor 20 changes to a state of being less than the determination threshold value ωth. Thus, even when the rotational velocity ω temporarily becomes less than the determination threshold value ωth, the steering holding gain G1 of a certain magnitude can be maintained.

While the steering system is in the steering holding state, the rotational velocity ω is maintained less than the determination threshold value ωth. Thus, the steering holding determination-dependent gain G2a gradually decreases following the value "0" of the steering holding determination-dependent gain G2 set by the gain setting unit 52. When the steering holding determination-dependent gain G2a becomes less than the rotational velocity-sensitive gain G3, the rotational velocity-sensitive gain G3 is output as the steering holding gain G1. Then, the steering holding gain G1 changes with a small delay with respect to change in the rotational velocity ω (or changes without delay with respect to the rotational velocity ω). Therefore, when a driver starts steering and the rotational velocity ω increases, the steering holding gain G1 immediately increases.

Figure 2:
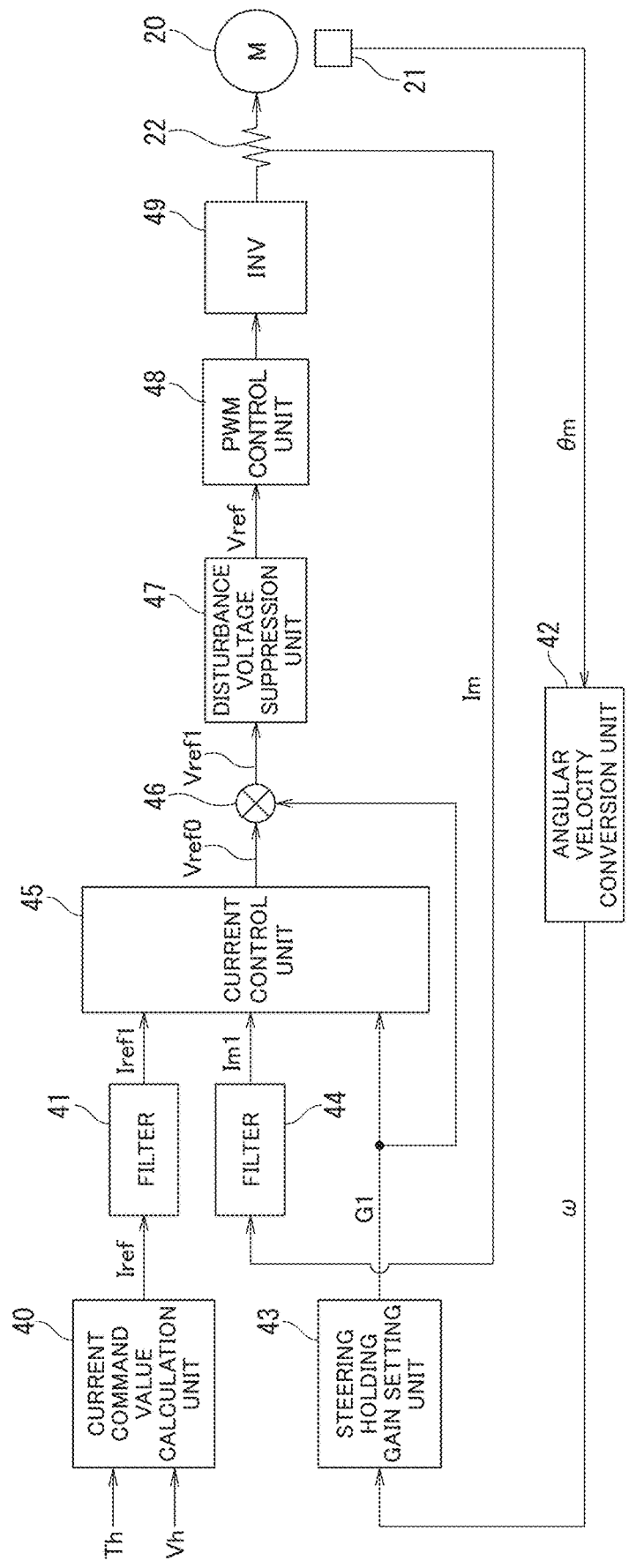
FIG. 2 is a block diagram illustrative of an example of a functional configuration of a controller illustrated in FIG. 1.

FIG. 2 is now referred to. The filter 44 performs filter processing on a measured value Im of the driving current of the motor 20 that is detected by the motor current detector 22 and thereby outputs a measured value Im1 obtained by reducing noise included in the measured value Im. The filter 44 may be, for example, a low-pass filter.

The current control unit 45 calculates a base voltage command value Vref0, based on current deviation ΔI= (Iref1−Im1) of the measured value Im1 of the driving current with respect to the current command value Iref1.

For example, the current control unit 45 calculates the base voltage command value Vref0 by at least one of proportional control (P-control), integral control (I-control), and derivative control (D-control) based on the current deviations ΔI or a combination of the foregoing. That is, the current control unit 45 calculates the base voltage command value Vref0 by feedback control based on the current deviations ΔI. The base voltage command value Vref0 is an example of a "first voltage command value" described in the claim.

Figure 6:
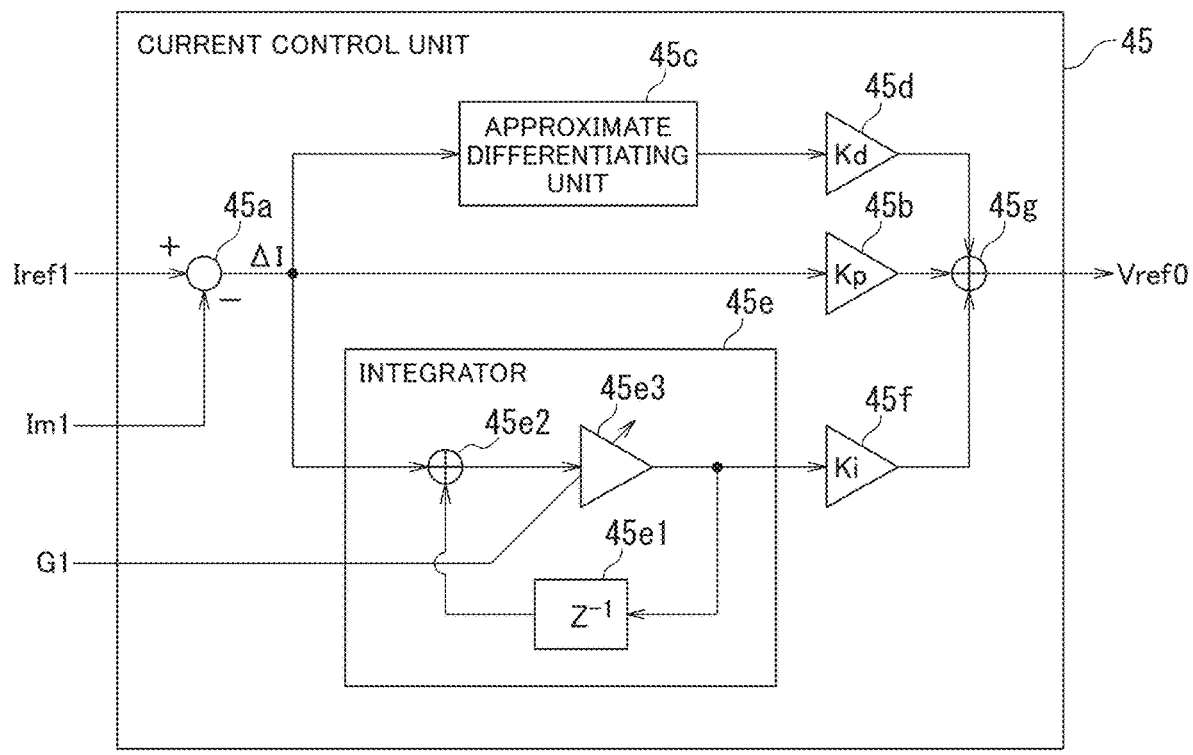
FIG. 6 is a block diagram illustrative of an example of a functional configuration of a current control unit.

FIG. 6 is a block diagram illustrative of an example of a functional configuration of the current control unit 45 when the base voltage command value Vref0 is calculated by proportional-integral-derivative (PID) control. The current control unit 45 includes a subtracter 45a, gain multiplication units 45b, 45d, and 45f, an approximate differentiating unit 45c, an integrator 45e, and an adder 45g.

The subtracter 45a calculates current deviation ΔI= (Iref1−Im1) of the measured value Im1 of the driving current with respect to the current command value Iref1.

The gain multiplication unit 45b outputs a multiplication result of the current deviation ΔI and a proportional gain Kp to the adder 45g.

The approximate differentiating unit 45c calculates a differential value of the current deviations ΔI. For example, the approximate differentiating unit 45c may calculate the differential value by multiplying the current deviations ΔI by a transfer function s/(Ts+1) that is obtained by combining a differential operation and a low-pass filter. The gain multiplication unit 45d outputs a multiplication result of the differential value of the current deviation ΔI and a differential gain Kd to the adder 45g.

The integrator 45e calculates an integrated value of the current deviations ΔI. The gain multiplication unit 45f outputs a multiplication result of the integrated value of the current deviation ΔI and an integral gain Ki to the adder 45g. The integral gain Ki is an example of a "fourth gain" described in the claims.

The adder 45g outputs a sum of the multiplication result of the current deviation ΔI and the proportional gain Kp, the multiplication result of the differential value of the current deviation ΔI and the differential gain Kd, and the multiplication result of the integrated value of the current deviation ΔI and the integral gain Ki, as the base voltage command value Vref0.

The integrator 45e includes a delay element 45e1, an adder 45e2, and a gain multiplication unit 45e3.

The delay element 45e1 delays output from the integrator 45e and subsequently inputs the delayed output to the adder 45e2. That is, the delay element 45e1 inputs a past value (a last value) of the output from the integrator 45e to the adder 45e2. The delay element 45e1 is an example of a "second delay element" described in the claims.

The adder 45e2 outputs a sum of the current deviation ΔI and output from the delay element 45e1. The gain multiplication unit 45e3 calculates a multiplication result of a gain depending on the steering holding gain G1 and the output from the adder 45e2 as output from the integrator 45e.

The gain by which the gain multiplication unit 45e3 multiplies the output from the adder 45e2 may be, for example, a gain having a smaller value when the steering holding gain G1 is small than when the steering holding gain G1 is large. For example, the gain by which the gain multiplication unit 45e3 multiplies the output from the adder 45e2 may be a gain having characteristics that the smaller the steering holding gain G1 is, the smaller value the gain has. For example, the gain multiplication unit 45e3 may multiply the output from the adder 45e2 by the steering holding gain G1 itself.

FIG. 2 is now referred to. The voltage command value limiting unit 46 calculates an intermediate voltage command value Vref1 by limiting the base voltage command value Vref0 by the steering holding gain G1. For example, the voltage command value limiting unit 46 calculates a smaller intermediate voltage command value Vref1 when the steering holding gain G1 is small than when the steering holding gain G1 is large.

For example, the voltage command value limiting unit 46 may be a multiplier that calculates a product of the base voltage command value Vref0 and the steering holding gain G1 as the intermediate voltage command value Vref1. The intermediate voltage command value Vref1 is an example of a "second voltage command value" described in the claim.

The disturbance voltage suppression unit 47 calculates a voltage command value Vref by suppressing influence that counter electromotive voltage or other disturbance voltage exerts on the intermediate voltage command value Vref1. The voltage command value Vref is an example of a "third voltage command value" described in the claim.

Figure 7:
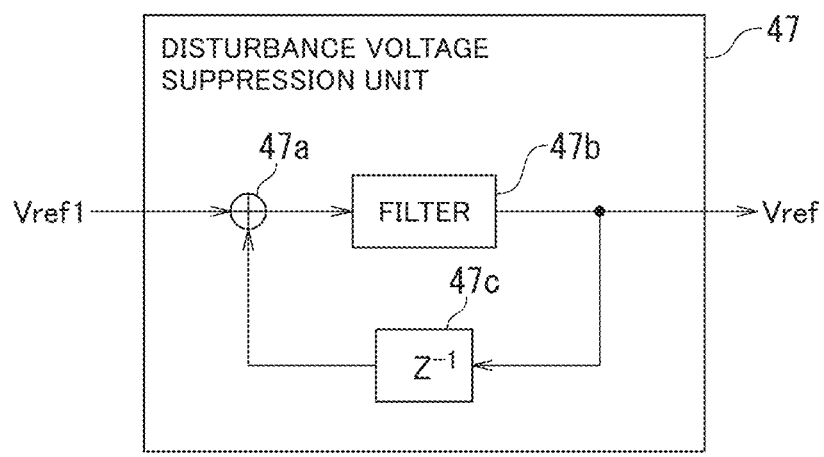
FIG. 7 is a block diagram illustrative of an example of a functional configuration of a disturbance voltage suppression unit.

FIG. 7 is a block diagram illustrative of an example of a functional configuration of the disturbance voltage suppression unit 47. The disturbance voltage suppression unit 47 includes an adder 47a, a filter 47b, and a delay element 47c. The delay element 47c is an example of a "first delay element" described in the claims.

The adder 47a outputs a sum of the intermediate voltage command value Vref1 and output from the delay element 47c.

The filter 47b reduces noise by performing filter processing on the sum of the intermediate voltage command value Vref1 and the output from the delay element 47c. For example, the filter 47b may be a low-pass filter. Output from the filter 47b is output from the disturbance voltage suppression unit 47 as the voltage command value Vref and is also input to the delay element 47c.

The delay element 47c delays the output from the filter 47b (that is, the voltage command value Vref) and subsequently inputs the delayed output from the filter 47b to the adder 47a. That is, the delay element 47c inputs a past value (a last value) of the voltage command value Vref to the adder 47a.

FIG. 2 is now referred to. The voltage command value Vref is input to a PWM control unit 48, and further, the motor 20 is PWM-driven by the inverter 49. Driving current of the motor 20 is detected by the motor current detector 22 and fed back to the subtracter 45a in the current control unit 45 via the filter 44.

Note that the controller 30 may perform vector control of calculating a q-axis current command value that is a component for generating torque and a d-axis current command value that is a component for generating a magnetic field as the current command values Iref1 and generating voltage command values, based on deviation between a motor current detected value of the q-axis and the q-axis current command value and deviation between a motor current detected value of the d-axis and the d-axis current command value.

Action

Next, actions of the electric power steering device of the embodiment will be described. The steering holding gain G1 that is set by the steering holding gain setting unit 43 has characteristics of being smaller when the absolute value $|\omega|$ of the rotational velocity of the motor 20 is small than when the absolute value $|\omega|$ is large, as illustrated in FIG. 4B.

Thus, the steering holding gain G1 is set to a smaller value in the steering holding state than at the time of regular steering. The voltage command value limiting unit 46 calculates the intermediate voltage command value Vref1 by limiting the base voltage command value Vref0 by the steering holding gain G1.

Thus, while the steering system is in the steering holding state, the intermediate voltage command value Vref1 becomes small. Therefore, noise included in the intermediate voltage command value Vref1 can be prevented from influencing the voltage command value Vref. As a result, while the steering system is in the steering holding state, influence of noise included in a control signal of the electric power steering device can be suppressed. Because of this capability, influence of noise in the steering holding state can be suppressed even without switching filter characteristics of the filters 41 and 44 between at the time of regular steering and in the steering holding state.

Since the disturbance voltage suppression unit 47, which is disposed in a succeeding stage of the voltage command value limiting unit 46, adds the intermediate voltage command value Vref1 to a past value of the voltage command value Vref, the disturbance voltage suppression unit 47 has an integrating function of accumulating the intermediate voltage command value Vref1. Thus, even when the intermediate voltage command value Vref1 becomes small due to the state of the steering system changing to the steering holding state, the voltage command value Vref that generates a steering assist force required for steering holding can be maintained by the integrating function of the disturbance voltage suppression unit 47.

In addition, since simply reducing the steering holding gain G1 when the absolute value $|\omega|$ of the rotational velocity of the motor 20 becomes small causes the intermediate voltage command value Vref1 to become small every time the absolute value $|\omega|$ of the rotational velocity becomes 0 in turning-back steering in the regular steering, the steering assist force becomes small and there is a risk that the driver feels resistance.

Therefore, as illustrated in FIG. 4B, even when the rotational velocity $\omega$ of the motor 20 changes to less than the determination threshold value $\omega$th, the magnitude of the steering holding gain G1 is maintained until a certain time length elapses immediately after the change. Because of this configuration, it is possible to prevent the driver from feeling resistance in the turning-back steering.

Subsequently, the steering holding gain G1 is changed with a small delay with respect to change in the rotational velocity $\omega$. Because of this configuration, the steering holding gain G1 can be increased in accordance with the steering of the steering wheel 1 or the steering shaft 2. As a result, the steering assist force can be output even when a small steering is performed while the steering is held. In addition, the output of the steering assist force can be resumed immediately after the steering system returns from the steering holding state to a regular steering state.

Note that when, as illustrated in FIG. 6, the feedback control performed by the current control unit 45 includes the integral control, an integrated value of the current deviation $\Delta I$ output from the integrator 45e increases (accumulates) since the base voltage command value Vref0 that the current control unit 45 outputs being limited by the steering holding gain G1 causes the current deviation $\Delta I$ to remain.

Thus, the gain multiplication unit 45e3 multiplies an integrated value of the current deviation $\Delta I$ by a gain depending on the steering holding gain G1 (or the steering holding gain G1 itself). Because of this configuration, an integrated value from the integrator 45e can be prevented from increasing (accumulating).

Operation

FIG. 8 is a flowchart of an example of a control method of the electric power steering device of the embodiment.

In step S1, the torque sensor 10, the vehicle speed sensor 12, the motor current detector 22, and the rotation angle sensor 21 detect the steering torque Th, the vehicle speed Vh, and the driving current Im and the rotation angle θm of the motor 20, respectively.

In step S2, the current command value calculation unit 40 calculates the base current command value Iref. The filter 41 outputs the current command value Iref1 by reducing noise in the base current command value Iref.

In step S3, the angular velocity conversion unit 42 calculates the rotational velocity ω of the motor 20, based on temporal change in the rotation angle θm.

In step S4, the steering holding gain setting unit 43 sets the steering holding gain G1, based on the rotational velocity ω of the motor 20.

In step S5, the filter 44 calculates the measured value Im1 of the driving current by reducing noise included in the measured value Im of the driving current of the motor 20. The current control unit 45 calculates the base voltage command value Vref0, based on the current deviation ΔI of the measured value Im1 of the driving current with respect to the current command value Iref1.

In step S6, the voltage command value limiting unit 46 calculates the intermediate voltage command value Vref1 by limiting the base voltage command value Vref0 by the steering holding gain G1.

In step S7, the disturbance voltage suppression unit 47 calculates the voltage command value Vref by suppressing influence that disturbance voltage exerts on the intermediate voltage command value Vref1.

In step S8, the PWM control unit 48 and the inverter 49 drive the motor 20, based on the voltage command value Vref. Subsequently, the process terminates.

Variations

Figure 9A:
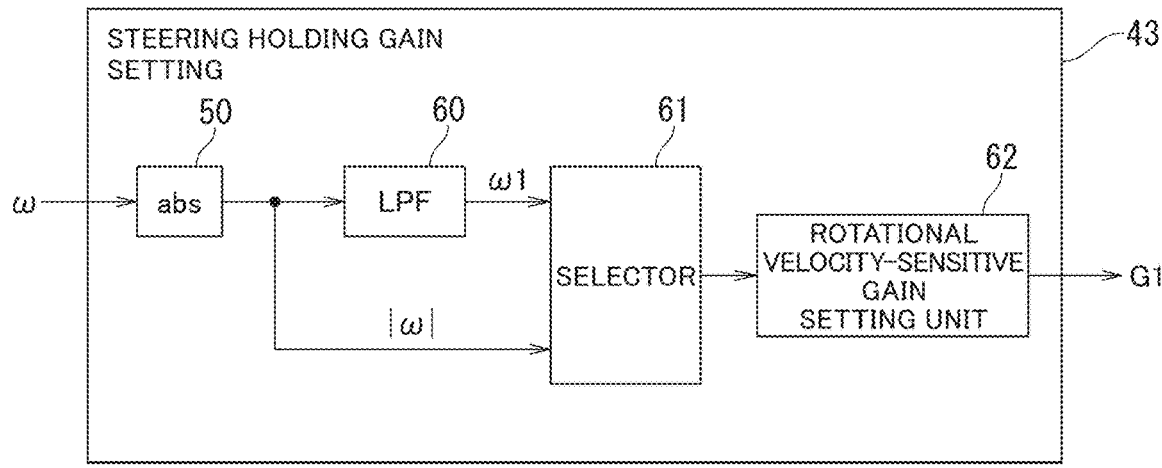
FIGS. 9A and 9B are block diagrams illustrative of examples of functional configurations of steering holding gain setting units of variations.
Figure 9B:
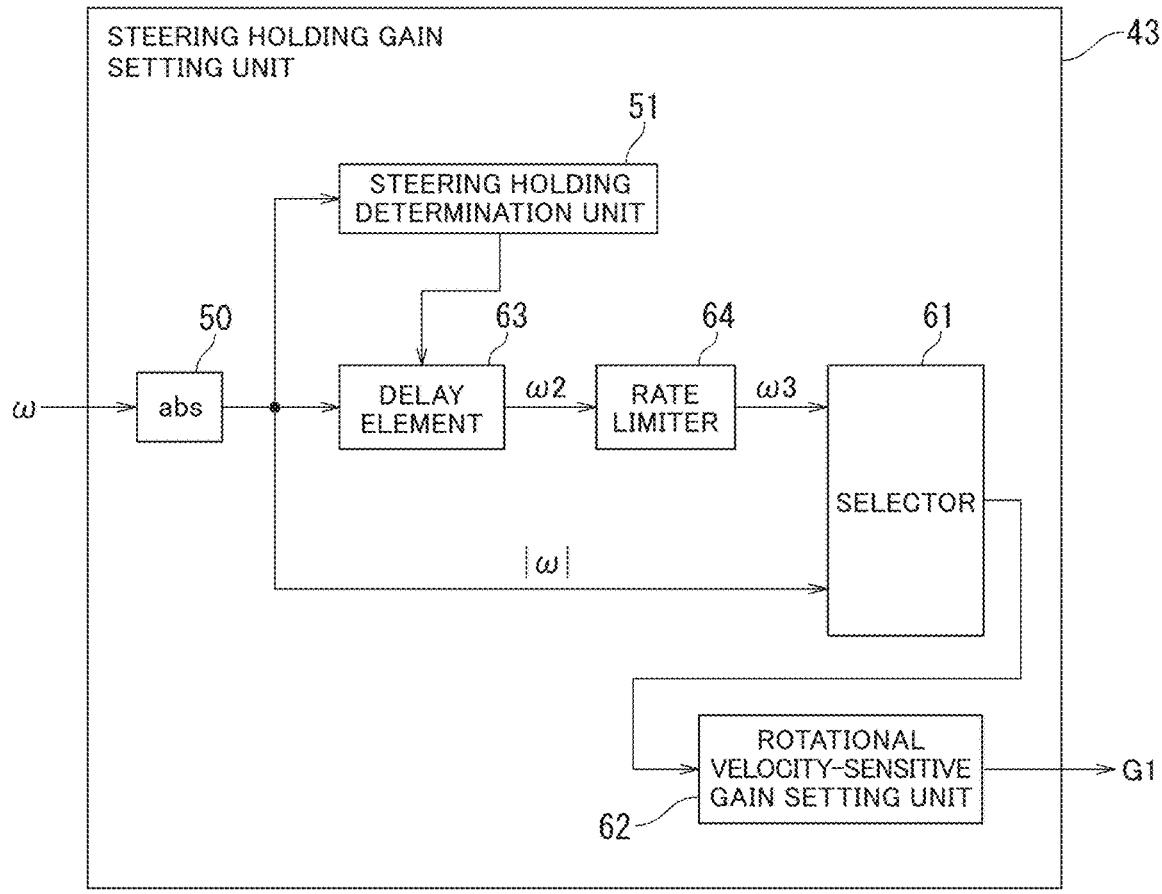

FIGS. 9A and 9B are block diagrams illustrative of examples of functional configurations of the steering holding gain setting unit 43 in variations. The steering holding gain setting unit 43 may compare a delayed rotational velocity signal obtained by delaying the rotational velocity ω of the motor 20 with the rotational velocity ω of the motor 20 and set a gain depending on a higher one of the rotational velocities as the steering holding gain G1.

For example, the steering holding gain setting unit 43 in FIG. 9A includes an absolute value calculation unit (abs) 50, a low-pass filter (LPF) 60, a selector 61, and a rotational velocity-sensitive gain setting unit 62.

The absolute value calculation unit 50 calculates an absolute value |ω| of the rotational velocity of the motor 20 and inputs the calculated absolute value |ω| to the low-pass filter 60 and the selector 61.

The low-pass filter 60 performs low-pass filter processing on the absolute value |ω| of the rotational velocity. The low-pass filter 60 inputs a rotational velocity signal ω1 after filter processing to the selector 61. The low-pass filter 60 acts as a delay element that delays the absolute value |ω| of the rotational velocity.

The selector 61 selects a larger one of the absolute value |ω| of the rotational velocity and the rotational velocity signal ω1 and inputs the selected one to the rotational velocity-sensitive gain setting unit 62.

The rotational velocity-sensitive gain setting unit 62 sets the steering holding gain G1 depending on output from the selector 61. Characteristics of the steering holding gain G1 that the rotational velocity-sensitive gain setting unit 62 sets may be, for example, similar characteristics to the characteristics of the rotational velocity-sensitive gain G3 that was described with reference to FIG. 5.

In addition, the steering holding gain setting unit 43 in FIG. 9B includes an absolute value calculation unit (abs) 50, a steering holding determination unit 51, a delay element 63, a rate limiter 64, a selector 61, and a rotational velocity-sensitive gain setting unit 62.

The steering holding determination unit 51 determines whether or not the steering system of the vehicle is in the steering holding state, based on whether or not the absolute value |ω| of the rotational velocity of the motor 20 is less than the determination threshold value ωth.

The delay element 63 outputs a rotational velocity signal ω2 obtained by delaying the absolute value |ω| of the rotational velocity when the state of the steering system changes from a state in which the steering system is determined not to be in the steering holding state to a state in which the steering system is determined to be in the steering holding state.

For example, the delay element 63 may maintain an output value at a time point at which the state of the steering system changes to the steering holding state for a predetermined delay time T0 when the state of the steering system changes from the state in which the steering system is determined not to be in the steering holding state to the state in which the steering system is determined to be in the steering holding state.

The rate limiter 64 limits a change rate of the rotational velocity signal ω2. For example, the rate limiter 53 limits the change rate in such a way that an absolute value of the change rate of the rotational velocity signal ω2 is less than or equal to a predetermined upper limit. The rate limiter 53 inputs a rotational velocity signal ω3 the change rate of which is limited to the selector 61.

The selector 61 selects a larger one of the absolute value |ω| of the rotational velocity and the rotational velocity signal ω3 and inputs the selected one to the rotational velocity-sensitive gain setting unit 62.

The rotational velocity-sensitive gain setting unit 62 sets the steering holding gain G1 depending on output from the selector 61. Characteristics of the steering holding gain G1 that the rotational velocity-sensitive gain setting unit 62 sets may be, for example, similar characteristics to the characteristics of the rotational velocity-sensitive gain G3 that was described with reference to FIG. 5.

Advantageous Effects of Embodiment (1) An electric power steering device includes: a motor configured to generate a steering assist force to be provided to a steering system of a vehicle; a current command value calculation unit configured to calculate a current command value to control driving current of the motor; a current control unit configured to output a first voltage command value, based on current deviation of a measured value of driving current of the motor with respect to the current command value; a first gain setting unit configured to set a first gain depending on rotational velocity of the motor; a disturbance voltage suppression unit configured to calculate a third voltage command value by adding output from a first delay element to a second voltage command value obtained by limiting the first voltage command value by the first gain and also input the third voltage command value to the first delay element; and a driving circuit configured to drive the motor, based on the third voltage command value.

Because of this configuration, while the steering system is in the steering holding state, noise included in the first voltage command value can be prevented from influencing the steering assist force only by limiting the first voltage command value by the first gain. Thus, it is possible to easily achieve at the same time both responsiveness of control of the electric power steering device at the time of regular steering and suppression of influence from noise while the steering system is in the steering holding state.

In addition, the disturbance voltage suppression unit having a function of integrating the second voltage command value enables the steering assist force required for steering holding to be maintained.

(2) The first gain setting unit may set a first gain in accordance with a larger one of a first component changing in a delayed manner with respect to change in rotational velocity of the motor and a second component changing in accordance with change in rotational velocity of the motor. For example, the second component may be a component that changes in accordance with change in rotational velocity of the motor with delay smaller than delay of the first component.

Because of this configuration, it is possible to prevent the driver from feeling resistance in the turning-back steering and also possible to output a steering assist force for a small steering while steering is held. In addition, the output of the steering assist force can be resumed immediately after the steering system returns from the steering holding state to a regular steering state.

(3) The first gain setting unit may include: a second gain setting unit configured to set a second gain according to whether or not the steering system is in a steering holding state, based on rotational velocity of the motor; and a rate limiter configured to limit a change rate of the second gain and output the limited second gain as the first component.

Because of this configuration, a first component that changes in a delayed manner with respect to change in the rotational velocity of the motor can be generated.

(4) The second gain setting unit may delay change in the second gain when a state of the steering system changes from a state of not being the steering holding state to the steering holding state.

Because of this configuration, a first component that changes in a delayed manner with respect to change in the rotational velocity of the motor can be generated.

(5) The first gain setting unit may include a low-pass filter configured to output the first component by performing low-pass filter processing on rotational velocity of the motor.

Because of this configuration, a first component that changes in a delayed manner with respect to change in the rotational velocity of the motor can be generated.

(6) The first gain setting unit may include: a third gain setting unit configured to set a third gain depending on rotational velocity of the motor; and a selector configured to select a larger one of the first component and the third gain as the first gain.

Alternatively, the first gain setting unit may include: a selector configured to select and output a larger one of the first component and the second component; and a gain setting unit configured to set a gain depending on output from the selector as the first gain.

Because of this configuration, a first gain can be set in accordance with a larger component of a first component that changes in a delayed manner with respect to change in the rotational velocity of the motor and a second component that changes in accordance with change in the rotational velocity of the motor.

(7) The current control unit may output the first voltage command value including an integral component proportional to an integral of the current deviation and suppress the integral component by the first gain. For example, the current control unit may include: an integrator configured to calculate an integrated value of the current deviation by multiplying a sum of the current deviation and output from a second delay element by a gain depending on the first gain and input the integrated value to the second delay element; and a multiplier configured to calculate the integral component by multiplying output from the integrator by a fourth gain.

Because of this configuration, an integrated value of the integrator can be prevented from increasing (accumulating) even when the first voltage command value that the current control unit outputs being limited by the first gain causes current deviation of the measured value of the driving current of the motor with respect to a current command value to remain.

REFERENCE SIGNS LIST

1 Steering wheel
2 Steering shaft
3 Reduction gear
4a, 4b Universal joint
5 Pinion rack mechanism
5a Pinion
5b Rack
6a, 6b Tie rod
7a, 7b Hub unit
8L, 8R Steered wheel
10 Torque sensor
111 Ignition key
112 Vehicle speed sensor
13 Battery
14 Steering angle sensor
20 Motor
21 Rotation angle sensor
22 Motor current detector
30 Controller
40 Current command value calculation unit
41, 44, 47b Filter
42 Angular velocity conversion unit
43 Steering holding gain setting unit
45 Current control unit
45a Subtracter
45b, 45d, 45e3, 45f Gain multiplication unit
45c Approximate differentiating unit
45e Integrator
45e1, 47c, 63 Delay element
45e2, 45g, 47a Adder
46 Voltage command value limiting unit
47 Disturbance voltage suppression unit
48 PWM control unit
49 Inverter
50 Absolute value calculation unit
51 Steering holding determination unit
52 Gain setting unit
53, 64 Rate limiter
54, 62 Rotational velocity-sensitive gain setting unit 55, 61 Selector
60 Low-pass filter

The invention claimed is:

1. An electric power steering device comprising:
a motor configured to generate a steering assist force to be provided to a steering system of a vehicle;
a current command value calculation unit configured to calculate a current command value to control driving current of the motor;
a current control unit configured to output a first voltage command value, based on current deviation of a measured value of driving current of the motor with respect to the current command value;
a first gain setting unit configured to set a first gain depending on rotational velocity of the motor;
a disturbance voltage suppression unit configured to calculate a third voltage command value by adding output from a first delay element to a second voltage command value obtained by limiting the first voltage command value by the first gain and also input the third voltage command value to the first delay element; and
a driving circuit configured to drive the motor, based on the third voltage command value.

2. The electric power steering device according to claim 1, wherein the first gain setting unit sets the first gain in accordance with a larger one of a first component changing in a delayed manner with respect to change in the rotational velocity of the motor and a second component changing in accordance with change in the rotational velocity of the motor.

3. The electric power steering device according to claim 2, wherein the second component changes in accordance with change in the rotational velocity of the motor with delay smaller than delay of the first component.

4. The electric power steering device according to claim 2, wherein
the first gain setting unit includes:
a second gain setting unit configured to set a second gain according to whether or not the steering system is in a steering holding state, based on the rotational velocity of the motor; and
a rate limiter configured to limit a change rate of the second gain and output the limited second gain as the first component.

5. The electric power steering device according to claim 4, wherein the second gain setting unit delays change in the second gain when a state of the steering system changes from a state of not being the steering holding state to the steering holding state.

6. The electric power steering device according to claim 2, wherein the first gain setting unit includes a low-pass filter configured to output the first component by performing low-pass filter processing on the rotational velocity of the motor.

7. The electric power steering device according to claim 2, wherein
the first gain setting unit includes:
a third gain setting unit configured to set a third gain depending on the rotational velocity of the motor; and
a selector configured to select a larger one of the first component and the third gain as the first gain.

8. The electric power steering device according to claim 2, wherein
the first gain setting unit includes:
a selector configured to select and output a larger one of the first component and the second component; and
a gain setting unit configured to set a gain depending on output from the selector as the first gain.

9. The electric power steering device according to claim 1, wherein the current control unit outputs the first voltage command value including an integral component proportional to an integral of the current deviation and suppresses the integral component by the first gain.

10. The electric power steering device according to claim 9, wherein
the current control unit includes:
an integrator configured to calculate an integrated value of the current deviation by multiplying a sum of the current deviation and output from a second delay element by a gain depending on the first gain and input the integrated value to the second delay element; and
a multiplier configured to calculate the integral component by multiplying output from the integrator by a fourth gain.

* * * * *